US008948792B2

(12) United States Patent
Arakawa

(10) Patent No.: US 8,948,792 B2
(45) Date of Patent: Feb. 3, 2015

(54) MOVING BODY AND SYSTEM FOR MANAGING INVENTORY INFORMATION OF MOVING BODY

(75) Inventor: Shuuji Arakawa, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/263,185

(22) PCT Filed: Apr. 6, 2010

(86) PCT No.: PCT/JP2010/056229
§ 371 (c)(1),
(2), (4) Date: Oct. 6, 2011

(87) PCT Pub. No.: WO2010/116992
PCT Pub. Date: Oct. 14, 2010

(65) Prior Publication Data
US 2012/0034935 A1 Feb. 9, 2012

(30) Foreign Application Priority Data

Apr. 8, 2009 (JP) .................................. 2009-093898

(51) Int. Cl.
*H04W 24/00* (2009.01)
*G08B 1/08* (2006.01)
(Continued)

(52) U.S. Cl.
CPC .............. *G06Q 10/087* (2013.01); *G06Q 10/06* (2013.01); *G06Q 50/08* (2013.01); *G06Q 50/28* (2013.01); *G08Q 1/20* (2013.01)
USPC ................ 455/456.6; 455/456.1; 340/539.13; 340/679; 701/454; 701/516

(58) Field of Classification Search
USPC ............. 455/404.2, 456.1–457, 414.1–414.2, 455/421; 340/539.13, 539.1, 540, 571, 340/572.1, 679; 701/29.1, 29.3, 32.3, 451, 701/454, 468–472, 482, 485, 516–517, 701/519–521; 705/28
See application file for complete search history.

(56) References Cited

U.S. PATENT DOCUMENTS 7,283,810 B1 10/2007 Arakawa et al.
8,217,777 B2 7/2012 Sekiyama et al.
(Continued)

FOREIGN PATENT DOCUMENTS

CN 1884973 A 12/2006
CN 101211429 A 7/2008
(Continued)

OTHER PUBLICATIONS

International Search Report dated Jun. 1, 2010, issue for PCT/JP2010/056229.
(Continued)

*Primary Examiner* — Michael Mapa
(74) *Attorney, Agent, or Firm* — Edwards Wildman Palmer LLP

(57) ABSTRACT

An object is to easily manage inventory information of an moving body such as a work machine at each physical distribution center substantially in real time, and an moving body 1 is provided with a positional information obtaining unit 22 for obtaining positional information of the moving body 1 at a predetermined timing, an operating state information obtaining unit 23 for obtaining operating state information of the moving body 1, and an inventory information output controller 24 for transmitting management information 37 which identifies the moving body 1, area information 35 which indicates an area in which the moving body 1 is located, and stay period information 38 in which this stays in the area to a management device 2 as the inventory information when the moving body 1 is located in any of one or more areas set in advance based on the positional information.

12 Claims, 6 Drawing Sheets

(51) Int. Cl.
*G08B 21/00* (2006.01)
*G06Q 10/08* (2012.01)
*G06Q 10/06* (2012.01)
*G06Q 50/08* (2012.01)
*G06Q 50/28* (2012.01)

(56) References Cited

U.S. PATENT DOCUMENTS

| | | | |
|---|---|---|---|
| 2003/0054808 A1* | 3/2003 | Watanabe et al. | 455/414 |
| 2003/0154091 A1* | 8/2003 | Adachi et al. | 705/1 |
| 2004/0004540 A1* | 1/2004 | Komatsu et al. | 340/426.18 |
| 2004/0203692 A1* | 10/2004 | Schwinke et al. | 455/419 |
| 2005/0055287 A1* | 3/2005 | Schmidtberg et al. | 705/28 |
| 2005/0086100 A1* | 4/2005 | Yanagisawa et al. | 705/13 |
| 2006/0082471 A1* | 4/2006 | Rockett et al. | 340/988 |
| 2006/0217848 A1* | 9/2006 | Oesterling et al. | 701/1 |
| 2007/0001873 A1 | 1/2007 | Ishikawa | |
| 2008/0146202 A1* | 6/2008 | Krause | 455/414.1 |
| 2009/0119003 A1* | 5/2009 | Takeda | 701/200 |

FOREIGN PATENT DOCUMENTS

| | | |
|---|---|---|
| JP | 2001-273586 A | 10/2001 |
| JP | 2002183621 | 6/2002 |
| JP | 2002215862 | 8/2002 |
| JP | 2003141688 | 5/2003 |
| JP | 2004-323199 A | 11/2004 |
| JP | 2004-326595 A | 11/2004 |
| JP | 2004355415 | 12/2004 |
| JP | 2006151698 | 6/2006 |
| JP | 2007293626 A | 11/2007 |
| JP | 2008-123272 A | 5/2008 |
| JP | 2009069958 | 4/2009 |
| WO | WO-00/55827 A1 | 9/2000 |

OTHER PUBLICATIONS

Decision of a patent grant mailed on Aug. 13, 2013 issued for corresponding Japanese Patent Application No. 2011-508366 with an English translation thereof.

* cited by examiner

MOVING BODY AND SYSTEM FOR MANAGING INVENTORY INFORMATION OF MOVING BODY

FIELD

The present invention relates to a moving body and a system for managing inventory information of moving body in which a plurality of moving bodies such as construction machines and a management device for managing each moving body are connected so as to be able to communicate with each other for monitoring a staying state of each moving body to manage inventory information of the moving body.

BACKGROUND

In order to grasp a condition of the moving body such as the construction machine arranged so as to be distributed in distant places, a system for monitoring moving body obtained by mounting a communication device on the moving body in which the communication device transmits positional information and the like of the moving body periodically obtained from positioning means including a GPS satellite to the management device of a manager is conventionally realized (refer to the patent literature 1).

CITATION LIST

Patent Literature

Patent Literature 1: Japanese Patent Application Laid-Open No. 2008-123272

SUMMARY

Technical Problem

The moving body such as a work machine goes through each physical distribution center such as a dealer, a port, a station and the like on the way from a manufacturing factory to a client. Herein, the inventory information which indicates the number of the moving bodies such as the work machines staying in each physical distribution center and a length of a stay period, is an important indicator when planning production, sale, transportation and the like. Therefore, a manager of each physical distribution center conventionally counts an inventory quantity of the moving bodies such as the work machines in managed premises of its own physical distribution center and reports information of a counted result to an inventory information manager who manages an entire inventory condition of the moving bodies such as the work machines. In this case, a timing of the report by the manager of each physical distribution center differs from the physical distribution center to another and also time delay occurs, so that there is a problem that delay might occur in adjustment of a plan of the production, the sale, the transportation and the like.

The present invention is achieved in view of the above description and an object thereof is to provide the moving body and the system for managing inventory information of moving body capable of easily managing the inventory information of the moving body such as the work machine at each physical distribution center substantially in real time.

Solution to Problem

According to an aspect of the present invention, a moving body, includes: a positional information obtaining unit for obtaining positional information of a moving body at a predetermined timing; and a controlling unit for transmitting a management information which specifies the moving body, an area information which indicates an area in which the moving body is located, and a stay period information in which the moving body stays in the area, when the moving body is located in one or more areas set in advance based on the positional information obtained by the positional information obtaining unit.

Advantageously, in the moving body, when the moving body is located in any of the areas and it reaches to a set time, the controlling unit transmits the management information which identifies the moving body, the area information which indicates the area in which the moving body is located, and the stay period information in which the moving body stays in the area at the set time.

Advantageously, the moving body further includes an operating state information obtaining unit for obtaining operating state information of the moving body. The controlling unit transmits the management information which specifies the moving body, the area information which indicates the area in which the moving body is located, and the stay period information in which the moving body stays in the area further, when an operating rate of the moving body is not larger than a predetermined operating rate and/or an accumulated operating time of the moving body is the same or shorter than predetermined accumulated operating time based on the operating state information.

Advantageously, the moving body further includes an area information storing unit for storing the area information.

Advantageously, the moving body further includes further comprising a reference operating information storing unit for storing reference operating information which indicates the predetermined operating rate and/or the predetermined accumulated operating time.

Advantageously, in the moving body, the positional information obtaining unit obtains the positional information of the moving body at a timing to turn on a key for starting the moving body and/or at a time interval set in advance.

Advantageously, in the moving body, the positional information obtaining unit obtains the positional information of the moving body at a timing to receive a predetermined signal from an external device.

Advantageously, in the moving body, the controlling unit performs power supply drive control to drive by a battery at a desired period regardless of an on/off state of the key for starting the moving body.

Advantageously, in the moving body, the controlling unit resets accumulation of the stay period information when the moving body deviates from a position of any area.

Advantageously, in the moving body, the controlling unit resets accumulation of the stay period information when the operating rate of the moving body is larger than the predetermined operating rate and/or the accumulated operating time of the moving body is larger than the predetermined accumulated operating longer Advantageously, in the moving body, the controlling unit transmits the area information which indicates a predetermined range centered on the positional information obtained by the positional information obtaining unit as the area together with the management information and the stay period information.

According to another aspect of the present invention, in a system for managing inventory information of moving body in which one or more moving bodies and a management device for managing the moving bodies are connected so as to be able to communicate with each other for monitoring a staying state of each moving body to manage inventory information of the moving body, the moving body includes a positional information obtaining unit for obtaining positional information of the moving body, and a controlling unit for transmitting management information which identifies the moving body, area information which indicates an area in which the moving body is located, and stay period information in which the moving body stays in the area to the management device when the moving body is located in any of one or more areas set in advance based on the positional information, and wherein the management device manages the inventory information of the moving body based on the management information, the area information, and the stay period information transmitted from each moving body.

Advantageous Effects of Invention

According to the present invention, when the moving body is located in any of one or more areas set in advance based on the positional information, the controlling means transmits the management information which specifies the moving body, the area information which indicates the area in which the moving body is located, and the stay period information in which this stays in the area to the management device, so that the inventory information of the moving body such as the work machine at each physical distribution center may be easily managed substantially in real time.

DESCRIPTION OF EMBODIMENTS

Hereinafter, a system for managing inventory information of moving body being an embodiment of the present invention is described with reference to the drawings.
(First Embodiment)

Figure 1:
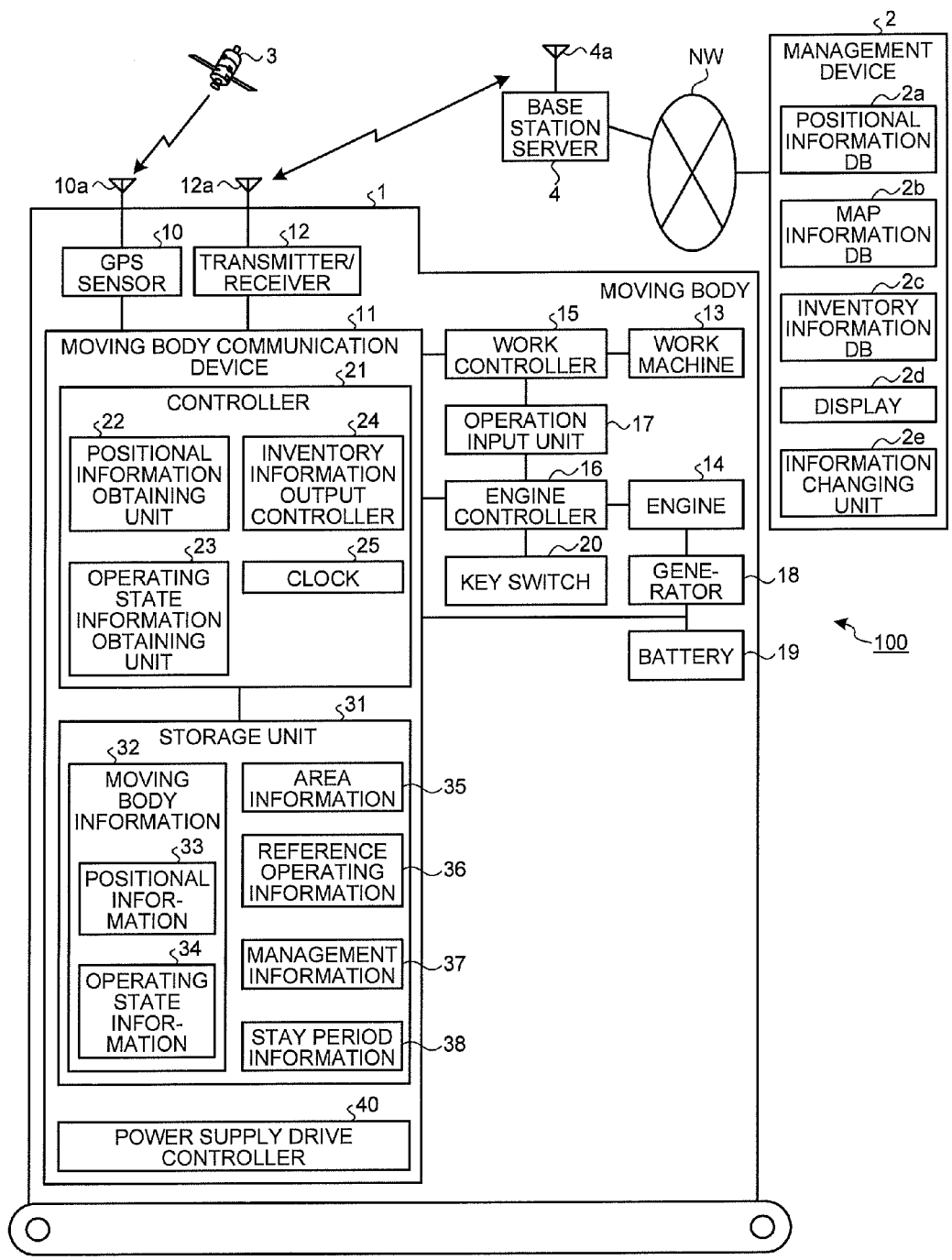
FIG. 1 is a schematic diagram illustrating a configuration of a system for managing inventory information of moving body according to a first embodiment of the present invention.

FIG. 1 is a schematic diagram illustrating an entire configuration of the system for managing inventory information of moving body according to a first embodiment of the present invention. A system for managing inventory information of moving body 100 has a plurality of moving bodies 1 being management objects and a management device 2 communication-connected to the moving bodies 1 for executing inventory management of each moving body 1 using inventory information transmitted from the moving body 1. The moving body 1 is capable of measuring a self-position based on electrical waves transmitted from a plurality of GPS satellites 3 and of communicating with a base station server 4 via wireless communication. Also, the management device 2 is communication-connected to the base station server 4 via a network NW.

The moving body 1 has a GPS sensor 10 for receiving the electrical wave transmitted from the GPS satellite 3 via an antenna 10a, a moving body communication device 11 for obtaining positional information of the moving body 1 based on the electrical wave received by the GPS sensor 10 and transmitting the inventory information of the moving body to the management device 2 using the obtained positional information, and a transmitter/receiver 12 communication-connected to the base station server 4 for transmitting the inventory information output from the moving body communication device 11. The transmitter/receiver 12 transmits/receives the information to/from the base station server 4 via antennas 12a and 4a.

The moving body 1 is a construction machine having a work machine 13 such as a bucket and an arm and an engine 14 being a driving source. The work machine 13 is drive-controlled by a work controller 15. The engine 14 is drive-controlled by an engine controller 16. A drive-control command is input to the work controller 15 and the engine controller 16 by means of an operation input unit 17. The engine 14 is connected to a generator (alternator) 18 and a battery 19 being a power supply of the moving body 1 is charged by driving of the generator 18. A key switch 20 generates an engine starting signal to turn on a power supply of an electrical component.

The moving body communication device 11 has a controller 21, a storage unit 31, and a power supply drive controller 40. The controller 21 has a positional information obtaining unit 22 for obtaining the positional information of the moving body 1 from the GPS sensor 10, an operating state information obtaining unit 23 for obtaining operating state information which indicates an operating state of the moving body 1, an inventory information output controller 24 for controlling to output the inventory information of the moving body 1 based on the positional information and the operating state information, and a clock 25 having a timer function for clocking time. The operating state information of the moving body 1 is information which indicates whether the moving body 1 is in the operating state based on a service meter, a battery voltage, an engine water temperature, an engine speed, a pump pressure, steering wheel operation and the like, for example. For example, the service meter records the operating state when an output of the generator is not smaller than a predetermined voltage. The moving state information obtaining unit 23 obtains operating time obtained by accumulating time in which the engine 14 is driving from the service meter, for example.

Figure 3:
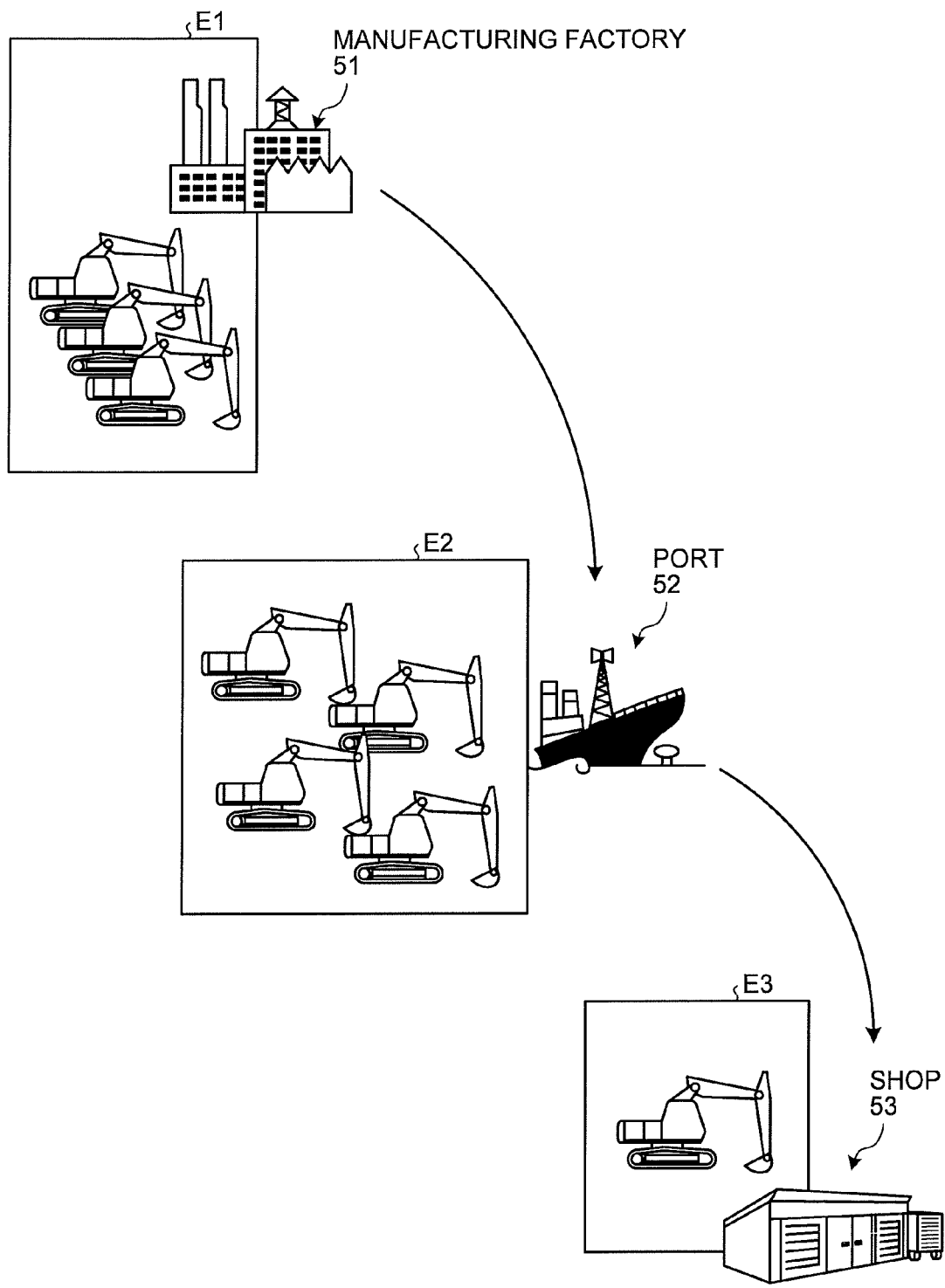
FIG. 3 is a view illustrating an example of an area.

The storage unit 31 has moving body information 32 related to the moving body including positional information 33 obtained by the positional information obtaining unit 22 and operating state information 34 obtained by the operating state information obtaining unit 23, and area information 35 in which one or more areas set in advance for managing an inventory state of the moving body 1 is described. Also, the storage unit 31 has reference operating information 36 which indicates predetermined time or a predetermined operating rate being a criterion for judging whether the moving body is in inventory. Further, the storage unit 31 has management information 37 which identifies the moving body 1, and stay period information 38 of a period in which the moving body 1 stays in the area. Meanwhile, the stay period information 38 is clocked by the clock 25 provided on the moving body 1. The stay period information 38 may be the time or the number of days during which the moving body 1 stays in the same area or may be a sum of the time or the number of days during which the moving body 1 stays in a plurality of areas. The stay period information 38 is stored in the storage unit 31. For example, as illustrated in FIG. 3, when the moving body 1 stays in an area E1 being a manufacturing factory 51 for three days, the stay period information 38 is information which indicates a period of three days. Also, if the moving body 1 stays in the area E1 being the factory 51 for two days and thereafter stays in an area E2 being a port 52 for five days, the stay period information 38 is the information which indicates the period of seven days being a sum of the staying days.

The power supply drive controller 40 controls such that power may be supplied from the battery 19 even when the key switch 20 is in an off state. In this case, it is preferable that the power supply drive controller 40 saves electricity by performing control to repeatedly start and stop at a constant period in order to prevent battery consumption. Meanwhile, when the moving body 1 stops, it is possible that the battery 19 supplies power to the clock 25 and the inventory information output controller 24 of the controller 21 and supplies electricity so as to start the power supply drive controller 40 when the inventory information output controller 24 judges that current time reaches predetermined time, and the power supply drive controller 40 supplies electricity from the battery 19 to the moving body communication device 11 and the storage unit 31. Also, when the moving body 1 stops, it is also possible that the battery 19 always supplies low electricity corresponding to standby electricity to the transmitter/receiver 12 and supplies electricity to the moving body communication device 11, the storage unit 31, and the power supply drive controller 40 when the transmitter/receiver 12 receives an inventory information transmitting command signal from an external device such as the management device 2, for example.

The management device 2 has a positional information data base (DB) 2a for storing the positional information of the moving body 1 transmitted from the moving body communication device 11, a map information database (DB) 2b for storing map information, an inventory information database (DB) 2c for storing the inventory information, and a display 2d for generating an image based on the positional information, the map information, and the inventory information to display. The display 2d especially performs a graphic display based on the inventory information. Further, the management device 2 has an information changing unit 2e and the information changing unit 2e may remotely perform an information changing process such as addition, removal, and change of at least the area information 35 and the reference operating information 36.

Figure 2:
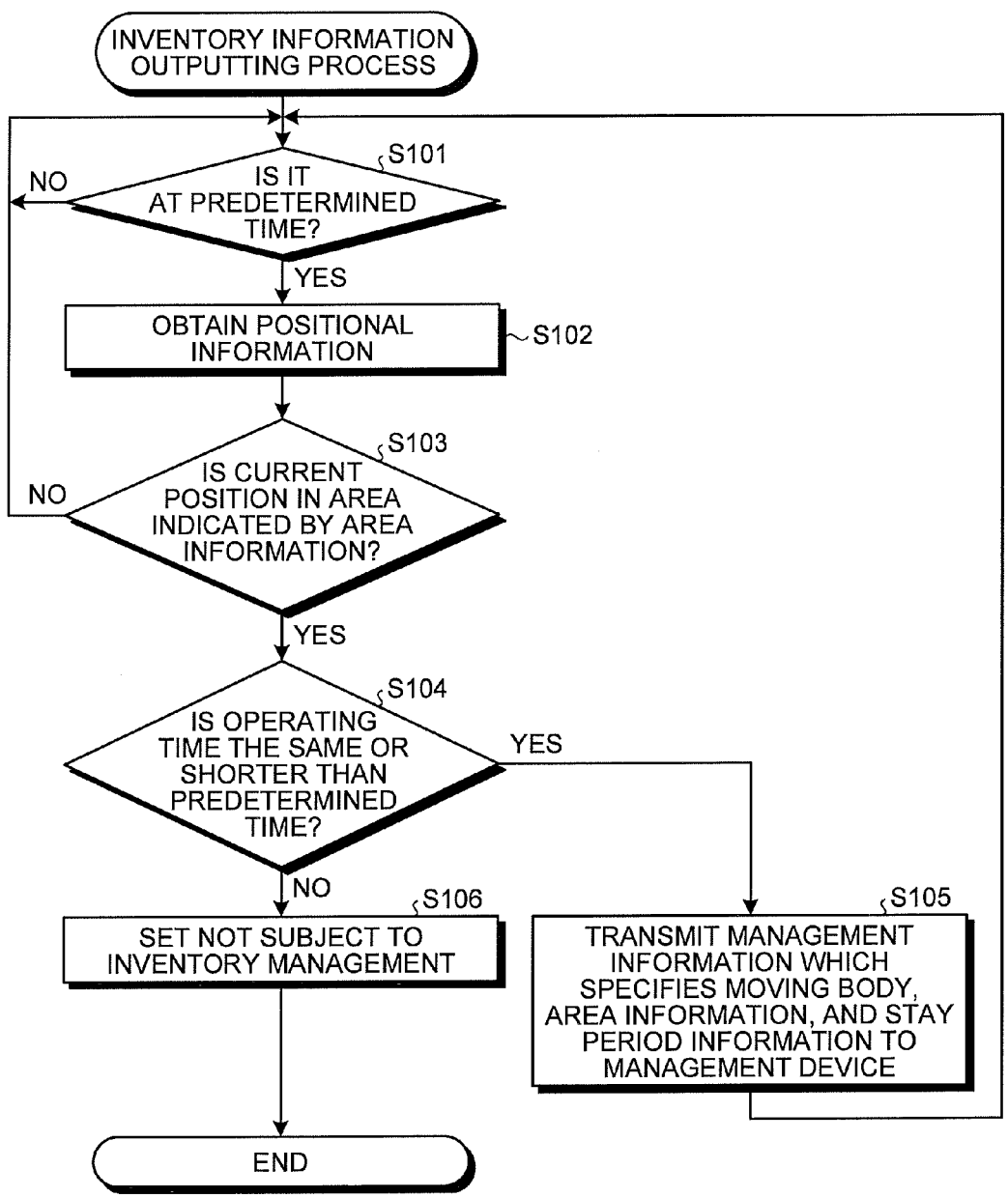
FIG. 2 is a flowchart illustrating an inventory information output procedure by an inventory information output controller illustrated in FIG. 1.

Herein, an inventory information output procedure by the inventory information output controller 24 is described with reference to a flowchart illustrated in FIG. 2. In FIG. 2, the inventory information output controller 24 first judges whether the current time is at the predetermined time set in advance (step S101). The predetermined time may be constant time such as 20 o'clock every day or may be the time set in advance by a calendar, for example.

When it is at the predetermined time (step S101, Yes), the positional information obtaining unit 22 obtains the positional information being a current position of the moving body 1 (step S102), and when it is not at the predetermined time (step S101, No), this judging process is repeated. Thereafter, it is judged whether the obtained current position is in the area indicated by the area information 35 (step S103). When the current position is not in the area (step S103, No), the procedure shifts to the step S101 to repeat the above described process, and when the current position is in the area (step S103, Yes), it is further judged whether the operating time indicated by the operating state information 34 obtained by the operating state information obtaining unit 23 is same or shorter than the predetermined time indicated by the reference operating information 36 (step S104).

When the operating time is same or shorter than the predetermined time (step S104, Yes), the management information 37 which identifies the moving body 1, the area information 35 which indicates the area in which the moving body 1 is judged to be present by the judging process at the step S103, and the stay period information 38 of the period in which the moving body 1 is stayed in the area are transmitted to the management device 2 as the inventory information (step S105) and the procedure shifts to the step S101. On the other hand, when the operating time is longer than the predetermined time (step S104, No), it is set that the moving body 1 is in the operating state and is the moving body which is not subject to the inventory management, (step S106) to finish this process. Meanwhile, although it is set that the moving body 1 is not subject to the inventory management at the step S106 to finish this process when the operating time is longer than the predetermined time (step S104, No), it is also possible that the procedure shifts to the step S101 in place of the process at the step S106 to substantially repeat the loop.

Further, although the positional information is obtained at the predetermined time at the step S101, there is no limitation and it is also possible to obtain the positional information when the key switch 20 is turned on.

Although it is judged whether the operating time is same or shorter than the predetermined time at the step S104, there is no limitation and it is also possible to judge whether an operating rate is not larger than the predetermined operating rate in place of the operating time.

Herein, it is only necessary that the management information 37 may identify the moving body 1, and this is realized by a serial number and a model number of the moving body 1, identification information of the moving body communication device 11 and the like. Also, it is only necessary that the area information 35 may identify the area, and this may be a coordinate display by latitude and longitude or an ID or a name.

FIG. 3 is a view illustrating a specific area. As illustrated in FIG. 3, the area includes the area E1 being the manufacturing factory 51, the area E2 being the port 52, and an area E3 being a shop 53. Also, in FIG. 3, it is possible to represent each of the areas E1 to E3 in coordinates as a rectangular region, and it is possible to specify each of the areas E1 to E3 by specifying coordinate positions of opposing two corners.

Figure 4:
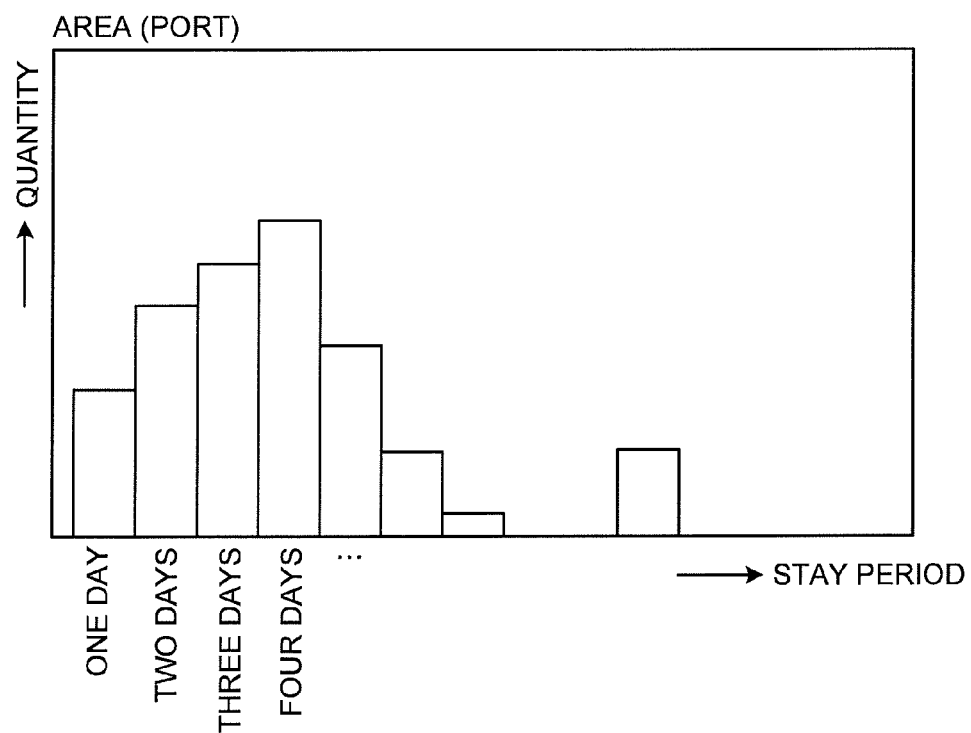
FIG. 4 is a view illustrating an example of a graphic display of inventory information by a display.
Figure 5:
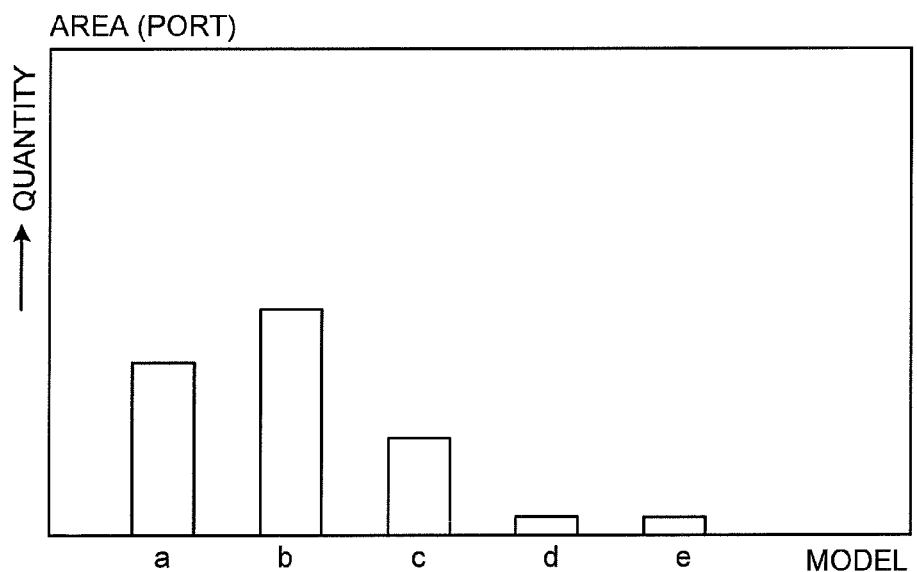
FIG. 5 is a view illustrating an example of the graphic display of the inventory information by the display.

Herein, the management information, the area information, and the stay period information which are transmitted, are stored in the inventory information DB2c of the management device 2. Then, the display 2d may perform the graphic display as illustrated in FIG. 4 or 5. FIG. 4 is a histogram which indicates the number for each stay period in the area E2 being the port 52, for example, and the display 2d performs the graphic display for each area. Also, FIG. 5 is a histogram which indicates the number for each model in the area E2 being the port 52, for example, and the display 2d performs the graphic display for each area. Meanwhile, it is also possible that a map is displayed in advance by the display 2d, for example, and the histograms illustrated in FIGS. 4 and 5 are displayed when a region on the map corresponding to the area is clicked. Meanwhile, in this embodiment, the moving body 1 of the inventory management object is judged on condition that the moving body 1 is treated as the inventory when the moving body 1 is present in a range of the area illustrated in FIG. 3 set in the area information 35 in advance (step S103 in FIG. 2). However, there might be a case in which the moving body 1 which should be managed as the inventory, moves outside the area supposed in advance by a planner of production, sale, transportation and the like of the moving body 1. Therefore, when the moving body 1 moves from a current area, the positional information obtaining unit 22 may obtain the positional information after the movement and calculate a certain range centering on the obtained positional information (for example, a circle with a radius not larger than 300 m centering on the positional information, a square or a rectangle with corners at a certain distance centering on the positional information) to set the obtained certain range in the area information 35 as a new area. That is to say, the step S103 in FIG. 2 may be replaced with such a process. By performing such process, even when the movement of the moving body 1 is beyond expectation of the planer of the production, the sale, the transportation and the like of the moving body 1, the inventory may be surely managed.

(Second Embodiment)

Next, a second embodiment of the present invention is described. Although the inventory information is transmitted to the management device 2 when the current position of the moving body 1 is in the area and when the operating time is same or shorter than the predetermined time in the above described first embodiment, the inventory information is transmitted to the management device 2 when the current position of the moving body 1 is in the area in the second embodiment. Meanwhile, the configuration of the system for managing inventory information of moving body according to the second embodiment is identical to that illustrated in FIG. 1, but the process by the inventory information output controller 24 is different.

Figure 6:
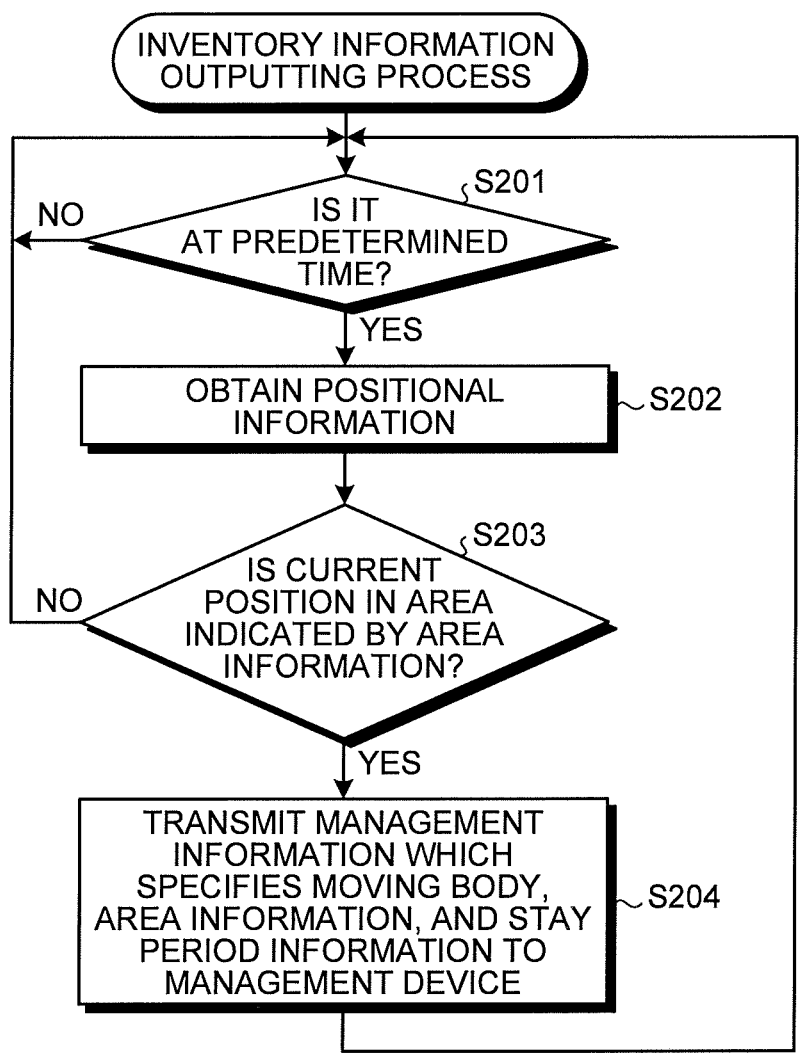
FIG. 6 is a flowchart illustrating an inventory information output control procedure by the system for managing inventory information of moving body according to a second embodiment of the present invention.

FIG. 6 is a flowchart illustrating the inventory information output procedure by the system for managing inventory information of moving body according to the second embodiment of the present invention. In FIG. 6, the inventory information output controller 24 judges whether the current time is at the predetermined time set in advance (step S201). When it is at the predetermined time (step S201, Yes), the positional information obtaining unit 22 obtains the positional information being the current position of the moving body 1 (step S202) and when it is not at the predetermined time (step S201, No), the judging process is repeated. Thereafter, it is judged whether the obtained current position is in the area indicated by the area information 35 (step S203). When the current position is not in the area (step S203, No), the procedure shifts to the step S201 to repeat the above described process.

When the current position is in the area (step S203, Yes), the management information 37 which identifies the moving body 1, the area information 35 which indicates the area in which the moving body 1 is judged to be present by the judging process at the step S203, and the stay period information 38 of the period in which the moving body 1 is stayed in this area are transmitted to the management device 2 as the inventory information (step S204), and the procedure shifts to the step S201 to repeat the above described process.

In the second embodiment, it is possible to easily transmit the inventory information to the management device 2 without judging the operating time and the like.

In this case, the management device 2 repeatedly receives the inventory information when the moving body 1 is present in the area.

(Third Embodiment)

Next, a third embodiment of the present invention is described. Although updating of the stay period information is not especially mentioned in the above described first and second embodiments, the stay period information is made stay period count data and the stay period information is updated by a simple configuration in the third embodiment.

That is to say, the stay period information 38 illustrated in FIG. 1 serves as the stay period count data and the inventory information output controller 24 performs an outputting process of the inventory information using the stay period count data.

Figure 7:
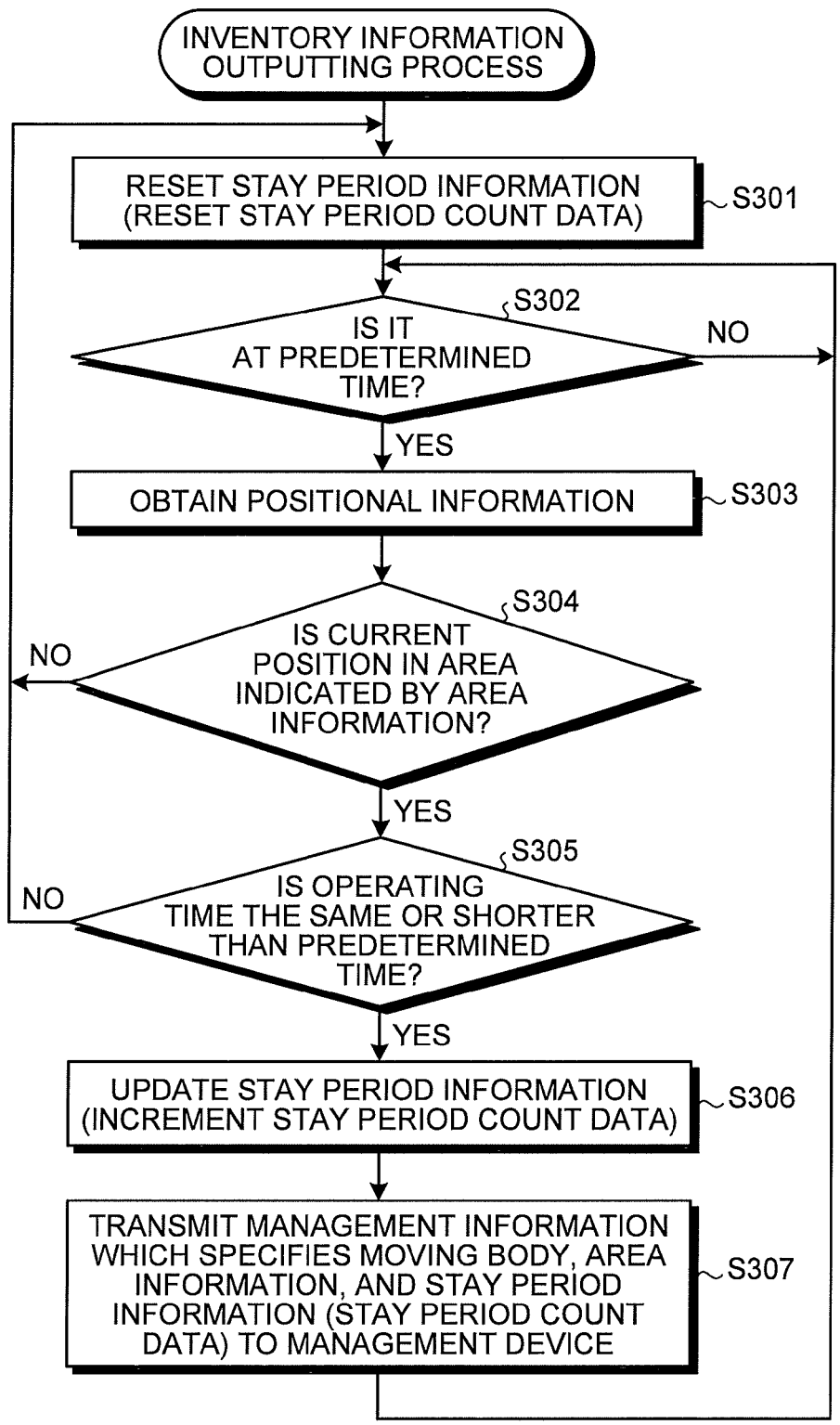
FIG. 7 is a flowchart illustrating the inventory information output control procedure by the system for managing inventory information of moving body according to a third embodiment of the present invention.

FIG. 7 is a flowchart illustrating the inventory information output procedure by the system for managing inventory information of moving body according to the third embodiment of the present invention. In FIG. 7, the inventory information output controller 24 first resets the stay period information, that is to say, resets the stay period count data (step S301). Thereafter, as in the first and second embodiments, it is judged whether the current time is at the predetermined time set in advance (step S302). When it is at the predetermined time (step S302, Yes), the positional information obtaining unit 22 obtains the positional information being the current position of the moving body 1 (step S303), and when it is not at the predetermined time (step 302, No), the judging process is repeated.

Thereafter, it is judged whether the obtained current position is in the area indicated by the area information 35 (step S304). When the current position is not in the area (step S304, No), the procedure shifts to the step S301 to repeat the above described process, and when the current position is in the area (step S304, Yes), it is further judged whether the operating time indicated by the operating state information 34 obtained by the operating state information obtaining unit 23 is same for shorter than the predetermined time indicated by the reference operating information 36 (step S305).

When the operating time is same or shorter than the predetermined time (step S305, Yes), the stay period information is updated, that is to say, the stay period count data is incremented (step S306). For example, when an interval of the predetermined time is one day, one day is added to a value of the stay period count data. Thereafter, the management information 37 which identifies the moving body 1, the area information 35 which indicates the area in which the moving body 1 is judged to be present by the judging process at the step S304, and the stay period information 38 of the period in which the moving body 1 is stayed in the area (stay period count data) are transmitted to the management device 2 (step S307) as the inventory information and the procedure shifts to the step S302. On the other hand, when the operating time is not the same or shorter than the predetermined time (step S305, No), the procedure shifts to the step S301, the stay period count data is reset, and the above described process is repeated.

INDUSTRIAL APPLICABILITY

As described above, the system for managing inventory information of moving body according to the present invention is useful for the construction machine and is especially suitable for the system for managing inventory information of moving body in which a plurality of moving bodies such as the construction machines and the management device for managing each moving body are connected so as to be able to communicate with each other for monitoring a staying state of each moving body to manage the inventory information of the moving body.

REFERENCE SIGNS LIST 1 moving body
2 management device
2a positional information database
2b map information database
2c inventory information database
2d display
2e information changing unit
3 GPS satellite
4 base station server
4a, 10a, 12a antenna
10 GPS sensor
11 moving body communication device
12 transmitter/receiver
13 work machine
14 engine
15 work controller
16 engine controller
17 operation input unit
18 generator
19 battery
20 key switch
21 controller
22 positional information obtaining unit
23 operating state information obtaining unit
24 inventory information output controller
25 clock
31 storage unit
32 moving body information
33 positional information
34 operating state information
35 area information
36 reference operating information
37 management information
38 stay period information
40 power supply drive controller
51 manufacturing factory
52 port
53 shop
100 system for managing inventory information of moving body

The invention claimed is:

1. A construction machine, comprising: a processor; a positional information obtaining unit for obtaining positional information of the construction machine at a predetermined timing; and a controlling unit for transmitting inventory information to a managing device for executing inventory management of the construction machine, when the construction machine is located in one or more areas set in advance for managing an inventory state of the construction machine based on the positional information obtained by the positional information obtaining unit, the inventory information comprising: a management information which specifies the construction machine, an area information which indicates the area in which the construction machine is located, and a stay period information in which the construction machine stays in the area, and further comprising an operating state information obtaining unit for obtaining operating state information of the construction machine,
wherein the controlling unit transmits the inventory information when an operating rate of the construction machine is not larger than a predetermined operating rate and an accumulated operating time of the construction machine is the same or shorter than predetermined accumulated operating time based on the operating state information.

2. The construction machine according to claim 1, wherein, when the construction machine is located in any of the areas and it reaches to a set time, the controlling unit transmits the inventory information to the managing device,
the inventory information comprising
the management information which identifies the construction machine,
the area information which indicates the area in which the construction machine is located, and
the stay period information in which the construction machine stays in the area at the set time.

3. The construction machine according to claim 1, further comprising an area information storing unit for storing the area information.

4. The construction machine according to claim 1, further comprising a reference operating information storing unit for storing reference operating information which indicates the predetermined operating rate and/or the predetermined accumulated operating time.

5. The construction machine according to claim 1, wherein the positional information obtaining unit obtains the positional information of the construction machine at a timing to turn on a key for starting the construction machine and/or at a time interval set in advance.

6. The construction machine according to claim 1, wherein the positional information obtaining unit obtains the positional information of the construction machine at a timing to receive a predetermined signal from an external device.

7. The construction machine according to claim 1, wherein the controlling unit performs power supply drive control to drive by a battery at a desired period regardless of an on/off state of the key for starting the construction machine.

8. The construction machine according to claim 1, wherein the controlling unit resets accumulation of the stay period information when the construction machine deviates from a position of any area.

9. The construction machine according to claim 1, wherein the controlling unit resets accumulation of the stay period information when the operating rate of the construction machine is larger than the predetermined operating rate and/or the accumulated operating time of the construction machine is larger than the predetermined accumulated operating time.

10. The construction machine according to claim 1, wherein the controlling unit transmits the area information to the management device, the area information indicating a predetermined range centered on the positional information obtained by the positional information obtaining unit as new area together with the management information and the stay period information.

11. The construction machine according to claim 1, wherein the operating state information is based on one or more members selected from the group consisting of: a service meter, a battery voltage, an engine water temperature, an engine speed, a pump pressure or steering wheel operation.

12. A system for managing inventory information of construction machine in which one or more construction machines and a management device for managing the construction machines are connected so as to be able to communicate with each other for monitoring a staying state of each construction machine to manage inventory information of the construction machine, wherein, the construction machine includes a processor; a positional information obtaining unit for obtaining positional information of the construction machine, and a controlling unit for transmitting inventory information to the management device when the construction machine is located in any of one or more areas set in advance for managing an inventory state of the construction machine based on the positional information, the inventory information comprising: management information which identifies the construction machine, area information which indicates an the area in which the construction machine is located, and stay period information in which the construction machine stays in the area, and further comprising: an operating state information obtaining unit for obtaining operating state information of the construction machine, wherein the controlling unit transmits the inventory information when an operating rate of the construction machine is not larger than a predetermined operating rate and an accumulated operating time of the construction machine is the same or shorter than predetermined accumulated operating time based on the operating state information and wherein the management device manages an the inventory of the construction machine based on the inventory information transmitted from each construction machine.

* * * * *